United States Patent [19]

Zezza

[11] Patent Number: 5,567,788

[45] Date of Patent: Oct. 22, 1996

[54] LIQUID RESIN-FORMING COMPOSITION AND TWO-PACKAGE SYSTEM FOR PROVIDING THE COMPOSITION

[75] Inventor: Charles A. Zezza, Bridgewater, N.J.

[73] Assignee: Rhone-Poulenc Inc., Cranbury, N.J.

[21] Appl. No.: 171,217

[22] Filed: Dec. 21, 1993

[51] Int. Cl.$^6$ ..................................... C08F 236/22
[52] U.S. Cl. ............... 526/334; 526/329.6; 526/282; 526/313; 526/320; 526/327; 526/172; 526/192; 526/90; 526/227; 526/230
[58] Field of Search ............... 526/90, 172, 192, 526/282, 320, 329.6, 334, 313

[56] References Cited

U.S. PATENT DOCUMENTS

| | | | |
|---|---|---|---|
| 4,097,677 | 6/1978 | Emmons et al. | 560/220 |
| 4,131,580 | 12/1978 | Emmons et al. | 524/241 |
| 4,145,248 | 3/1979 | Van Eenam | 162/168.2 |
| 4,145,503 | 3/1979 | Emmons et al. | 526/282 |
| 4,178,425 | 12/1979 | Emmons et al. | 528/73 |
| 4,180,598 | 12/1979 | Emmons | 427/44 |
| 4,197,225 | 4/1980 | Emmons et al. | 524/650 |
| 4,230,834 | 10/1980 | Sirota | 525/308 |
| 4,261,872 | 4/1981 | Emmons et al. | 525/15 |
| 4,284,731 | 8/1981 | Moser et al. | 525/28 |
| 4,299,761 | 11/1981 | Emmons et al. | 524/853 |
| 4,333,971 | 6/1982 | Van Eenam | 427/389.9 |
| 4,400,413 | 8/1983 | Emmons et al. | 427/136 |
| 4,460,625 | 7/1984 | Emmons et al. | 427/136 |
| 4,810,757 | 3/1989 | Hardiman et al. | 525/306 |
| 4,826,923 | 5/1989 | Hardiman | 525/306 |
| 5,288,523 | 2/1994 | Klaiber et al. | 427/385.5 |

OTHER PUBLICATIONS

G. Odian, Principles of Polymerization, 2d Ed., Wiley New York, 1981, pp. 250–251.

*Primary Examiner*—Mark Nagumo
*Attorney, Agent, or Firm*—Paul J. Juettner

[57] ABSTRACT

A liquid resin-forming composition contains a polyether-ene such as a polyallyl glycidyl ether, a free radical-polymerizable monomer such as an acrylate ester, a free radical initiator such as an organic peroxide and/or an organic hydroperoxide and a promoter such as an amine and/or polyvalent metal carboxylate. Certain properties of the composition, specifically, its volatiles content, flash point and viscosity, can be such as to make the composition particularly useful for application to a solid permeable substrate such as a concrete structure where, upon curing, the resulting resin will heal and/or seal pores and/or small cracks in the substrate preventing or lessening its penetration by liquids.

28 Claims, No Drawings

LIQUID RESIN-FORMING COMPOSITION AND TWO-PACKAGE SYSTEM FOR PROVIDING THE COMPOSITION

BACKGROUND OF THE INVENTION

This invention concerns a liquid resin-forming composition, a storage stable two-package system for providing the composition when and where needed and various applications of the composition, e.g., in the manufacture of a polymer concrete, as a patching compound for the repair of concrete structures and as a coating or impregnant to seal a permeable substrate.

Liquid resin-forming compositions for application to permeable substrates, notably concrete structures, are known. On curing, the compositions provide resins which seal pores and/or small cracks in the substrate thereby preventing or lessening the penetration of liquids, e.g., water, organic solvents, acids, alkalis and other corrosive liquids, into the substrate. Compositions of this type, containing the monomers dicyclopentenyl acrylate (DCPA) and/or dicyclopentenyl methacrylate (DCPMA), individually and in admixture referred to by the designation DCP(M)A, optionally, an auxiliary monomer such as an acrylic ester, and a polymerization catalyst, e.g., an organic peroxide and a metal drier (siccative), have been successfully used to seal permeable surfaces such as concrete highway structures, industrial floors, etc. Illustrative of such compositions are those described in U.S. Pat. Nos. 4,131,580 and 4,197,225. Such compositions have also been disclosed for use in the manufacture of a polymer concrete. See, in this regard, U.S. Pat. No. 4,197,225.

However, the persistent objectionable odor of DCP(M)A has led to its replacement by one or a mixture of dicyclopentenyloxyalkyl esters, e.g., dicyclopentenenyloxyethyl acrylate (DCPEA) and/or dicyclopentenenyloxyethyl methacrylate (DCPEMA), individually and in admixture referred to by the designation DCPE(M)A. Liquid resin-forming compositions containing DCPE(M)A are disclosed in U.S. Pat. Nos. 4,097,677; 4,145,503; 4,178,425; 4,180,598; 4,261,872; 4,284,731; 4,299,761; 4,400,413; and, 4,460,625.

Since no two components of a liquid resin-forming composition containing DCPE(M)A, peroxide and metal drier are chemically stable in admixture with one another, the composition must be prepared when and where needed from a three-package system, the first package containing the DCPE(M)A and any auxiliary monomer(s), the second package containing the hydroperoxide and the third package containing the metal drier.

Liquid resin-forming compositions containing a polyether-ene, e.g., an allyloxy compound such as a polyallyl glycidyl ether (PAGE), a free radical-polymerizable compound such as an acrylate, a free radical initiator such as an organic peroxide or hydroperoxide and an initiator-activating promoter such as an amine or metal carboxylate are described in U.S. Pat. No. 4,333,971 (for application to fibrous materials such as paper to improve their wet strength) and U.S. Pat. No. 4,810,757 (to provide coatings for surfaces of unspecified nature). A commercially available PAGE, SANTOLINK XI-100, described in a product bulletin of the Monsanto Chemical Company, is indicated therein useful for formulating coatings to be applied to metal, plastic and wood.

SUMMARY OF THE INVENTION

General objects of the invention include the provision of a liquid resin-forming composition having use in the manufacture of such products as a polymer concrete, a patching compound and a coating or impregnant for a permeable substrate.

It is a specific object of the invention to provide such a composition containing a polyether-ene, a free radical-polymerizable compound, a free radical initiator and a promoter.

It is another specific object of the invention to provide such a composition possessing a balance of properties, specifically, a volatility and viscosity and flash point, which makes it especially well suited for application to concrete structures to heal/seal cracks or fissures therein and/or to prevent or lessen penetration of liquids therein.

By way of meeting these and other objects of the invention, there is also provided a liquid resin-forming composition which comprises a polyether-ene, a free radical-polymerizable compound, a free radical initiator and a promoter, the polyether-ene and the free radical polymerizable compound when mixed together having a volatility as measured by ASTM-D-2369 of not greater than about 40 weight percent, a flash point as measured by ASTM-D-3278 of at least about 71° C. (160° F.) and a viscosity at 25° C. (77° F.) and 50 rpm spindle speed as measured by ASTM-D-2393 of not greater than about 500 centipoises.

In addition to the foregoing liquid resin-forming composition, there is provided a method of sealing a solid permeable substrate.

The term "sealing" as used herein shall be understood to include all procedures which result in placement of the resin obtained from the liquid resin-forming composition of this invention upon and/or within a permeable substrate for the purpose of preventing or lessening penetration of the substrate by liquids. As such, "sealing" includes coating, impregnating and similar procedures which accomplish this result.

Unlike the known liquid resin-forming compositions containing DCP(M)A, the compositions of this invention exhibit no pronounced malodor and unlike the known liquid resin-forming compositions containing dicyclopentenyloxyalkyl ester(s) such as DCPE(M)A, an organic hydroperoxide free radical initiator and a metal-containing salt/complex as promoter which requires individual packages for each of these three ingredients, the compositions herein can be prepared from a two-package system which simplifies storage and inventory requirements and facilitates application of the compositions in the field.

DESCRIPTION OF THE PREFERRED EMBODIMENTS

The liquid resin-forming composition of this invention is intended to provide, when cured in situ, a resin which serves as a binder for aggregate or as a coating or impregnant for a permeable solid substrate to which it is applied, e.g., concrete, asphalt, cinder block, brick, wood, pressed powdered metal, etc. Its low volatiles content and high flash point allows the composition to be applied without elaborate safety precautions and its low viscosity enables it to readily penetrate pores, small cracks and fissures so that the resin which subsequently forms therein can more effectively prevent or lessen penetration of the substrate by liquids. These are particularly desirable characteristics for a resin-forming composition that is to be applied as a coating or impregnant to a concrete structure. Even when freshly poured, concrete often contains cracks and fissures into which water can flow or percolate causing structural damage. For example, in the case of concrete highway structures such as roads and bridge decks, penetration of the structures by water carrying dissolved salts can result in damaging corrosion and expansion of steel reinforcing rods. The liquid resin-forming composition of this invention is able to enter deeply into the pores and cracks in the concrete effectively sealing it against such penetration.

The polyether-ene employed in the liquid resin-forming compositions of this invention can be selected from among any of the polyether-ene monomers described in aforementioned U.S. Pat. No. 4,333,971 the disclosure of which is incorporated by reference herein. Mixtures of polyether-enes can, of course, be used. Preferably, the polyether-ene is a polyallyl glycidyl ether (PAGE) of the general formula

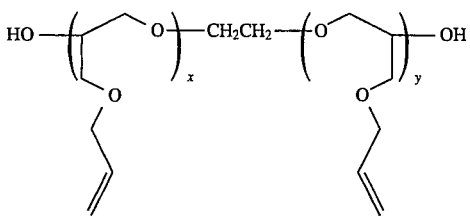

wherein the sum of x and y is at least about 8. A PAGE of the preferred type, SANTOLINK XI-100 (the sum of x and y is 10), is commercially available from Monsanto Chemical Company.

The free radical-polymerizable monomer can be selected from among any of the known materials of this type. Combinations of such monomers can be used. Preferred free radical-polymerizable monomers include one or more acrylate esters of the general formula

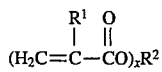

wherein x is 1 to 6, $R^1$ is hydrogen, methyl or ethyl and $R^2$ is an alkyl, aryl, alkaryl, cycloaliphatic, polyaryl or polycycloaliphatic group of up to about 30 carbon atoms,

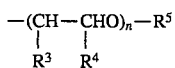

in which n is 1 to 100 and $R^3$, $R^4$ and $R_5$ each independently is hydrogen or an alkyl, aryl, alkaryl, cycloaliphatic, polyaryl or polycycloaliphatic group of up to about 30 carbon atoms. Examples of such acrylate esters include such relatively high boiling compounds as isobornyl methacrylate, nonylphenol ethoxylate (9) methacrylate, propylene glycol (8) dimethacrylate, triethylene glycol dimethacrylate, tripropylene glycol diacrylate, 1,4-butanediol diacrylate, 2-phenoxyethyl methacrylate, trimethylolpropane triacrylate, lauryl acrylate, myristyl acrylate, palmityl acrylate, oleyl acrylate, linolenyl acrylate, linolenyl acrylate, stearyl acrylate, and the like. Acrylates containing reactive functionalities, e.g., hydroxyl, can also be used. Illustrative of such acrylates are hydroxyethyl methacrylate and hydroxypropyl methacrylate. One or more acrylates of relatively low boiling point, e.g, methyl acrylate, methyl methacrylate, ethyl acrylate, ethyl methacrylate, etc., can also be present provided their amounts are not so high as to result in a liquid resin-forming composition which fails to meet the aforestated volatility and/or flash point requirements.

The free radical initiator will, of course, be one which is capable of initiating the polymerization of the selected free radical-polymerizable monomer. Particularly suitable are the organic peroxides and hydroperoxides such as benzoyl peroxide, tert-butylperbenzoate, 2,2-bis-(tert-butylperoxy)-butane, bis-(1-hydroxy-cyclohexyl)-butane, bis(1-hydroxy-cyclohexyl)-peroxide, tert-butylperoxy-isopropyl carbonate, tertiary-butylhydroperoxide, cumene hydroperoxide, methyl ethyl ketone hydroperoxide, diisopropylbenzene hydroperoxide, and the like. Azo-type free radical initiators such as azo-bis(butyronitrile) can also be used. Of course, combinations of two or more free radical initiators can be utilized in the liquid resin-forming composition herein.

The promoter can be one or more of any of the materials that are known to activate the free radical initiator selected for inclusion in the liquid resin-forming composition herein. Where the free radical initiator is an organic peroxide, it is generally advantageous to employ an amine-type promoter, e.g., aniline, N,N-dimethylaniline, toluidine, N,N-dimethyl p-toluidine, N,N-di(hydroxyethyl) toluidine, p-dimethylaminobenzaldehyde, and the like. Where the free radical initiator is an organic hydroperoxide, the promoter can advantageously be selected from among the polyvalent metal salts of higher aliphatic acids such as the butyrate, pentanoate, hexanoate, and especially the salts of higher aliphatic acids having from about 8 to about 30 carbon atoms or of naphthenic acids. Preferred metal salts are those of naphthenic acids or of $C_8$ to $C_{30}$ aliphatic acids. Examples of the polyvalent metal include copper(+2), zinc(+2), manganese(+2), manganese(+3), lead(+2), cobalt(+2), iron(+3), vanadium(+2) and zirconium(+4). Other examples of the acid component or anion of the metal salt promoter are those of resinic acids (rosin acids) such as tall oil fatty acids, linseed oil fatty acids, 2-ethylhexanoic acid, lauric acid, palmitic acid, myristic acid, stearic acid, oleic acid, linoleic acid, behenic acid, cerotic acid, monotanic acid and abietic acid. Preferred metal driers are those of cobalt and manganese, e.g., cobalt hexanoate, cobalt octoate, cobalt naphthenate, cobalt acetylacetonate, manganese octoate, manganese naphthenate manganese acetylacetonate, and the like.

Where the free radical initiator employs a metal-containing salt and/or metal-containing complex as the promoter(s), one or more accelerators can also be present, e.g., an amine such as any of those previously mentioned.

Of the combinations of free radical initiator and promoter than can be used in the liquid resin-forming compositions of this invention, it is preferred to employ the combination of an organic hydroperoxide and a metal-containing salt and/or metal-containing complex since such a combination generally results in a composition having a longer pot life than, e.g., a composition containing the combination of an organic peroxide and an amine. Longer pot life is advantageous since the viscosity of a liquid resin-forming composition having this characteristic will increase more slowly allowing the composition to penetrate more deeply into the permeable substrate to which it is applied.

Through appropriate selection of specific representatives of the foregoing components and their amounts, the liquid resin-forming composition of this invention can be readily formulated to exhibit a volatility as measured by ASTM-D-2369 of not greater than about 40 weight percent, preferably not greater than about 35 weight percent and more preferably not greater than about 30 weight percent, a flash point as measured by ASTM-D-3278 of at least about (71° C.) (160° F.), preferably at least about 82° C. (180° F.) and more preferably at least about 93° C. (200° F.) and a viscosity at 25° C. (77° F.) and 50 rpm spindle speed as measured by ASTM-D-2393 of not greater than about 500 centipoises, preferably not greater than about 100 centipoises and more preferably not greater than about 30 centipoises. The more preferred of the foregoing levels are in keeping with specifications established by the State of California Department of Transportation for concrete repair compositions based on high molecular weight acrylates such as DCP(M)A. Employing the designated testing methods carried out upon mixtures of the polyether-ene and the free radical-polymerizable monomer (subsequent addition of the free radical initiator and promoter will ordinarily have little influence on the measured properties), it can be readily determined whether a given liquid resin-forming composition satisfies each of the foregoing requirements or whether modification or adjustment of the composition may be necessary to meet one or more of such requirements.

In general, the polyether-ene can be present in the liquid resin-forming composition at a level of from about 5 to about 50, and preferably from about 15 to about 30, weight percent of the polyether-ene acid and free radical-polymerizable monomer combined and, correspondingly, the free radical-polymerizable compound can be present in the composition at a level of from about 95 to about 50, and preferably from about 85 to about 70, weight percent of these components.

The free radical initiator is typically present in relatively small amounts, e.g., from about 0.1 to about 6 weight percent of the polyether-ene and free radical-polymerizable monomer combined. The promoter is also present in small amounts, e.g., at a level of from about 0.0005 to about 4 weight percent of these combined components.

When used as a binder for the manufacture of a polymer concrete or a patching compound, it is preferred that the liquid resin-forming composition have a viscosity which is in at upper end of the aforestated limit, i.e., in the region at or approaching 500 centipoises. For details regarding the remaining components of the polymer concrete or patching compound, reference may be made to aforementioned U.S. Pat. Nos. 4,197,225, 4,299,761 and 4,400,413, the contents of which are incorporated by reference herein.

When the liquid resin-forming composition of the present invention is intended for use as a coating or impregnant for a porous substrate, it is preferred that it possess a viscosity which is at the lower end of the aforestated limit, e.g., not greater than about 100 centipoises and better yet, not greater than about 30 centipoises since the lower the viscosity, the greater the ease with which the composition will infiltrate the permeable substrate to which it is applied. The coating/impregnating composition can contain minor amounts of one or more additives such as coloring agents, pigments, texturing agents, inhibitors, stabilizers, antioxidants, and the like. The composition can also contain minor amounts of a filler such as sand and/or small aggregate subject, of course, to the limitation that the average particle size of the filler particles be substantially less than the size of the largest pore/cracks present in the substrate.

The liquid resin-forming composition can be applied to a permeable solid substrate such as any of those previously mentioned employing any suitable technique, e.g., coating, impregnating etc., and allowing the composition to cure in situ to provide a resin. Preferably, the composition will be formulated so as to have a surface cure time of not more than about 600 minutes and more preferably a surface cure time of not more than about 400 minutes. Surface cure time is determined by periodically contacting the surface of the composition with a cotton swab, paper towel or similar device while the composition is undergoing cure and noting when the surface no longer presents a tacky response.

Since curing (i.e., polymerization) activity begins as soon as all of the components of the liquid resin-forming composition herein have been combined, it is necessary to prepare the composition shortly before use. While one could assemble the composition from separate packages of each component, i.e., from four packages, it is far more convenient to prepare the composition when needed from two packages each of which is chemically stable by itself. Thus, it is preferred herein to provide the precursors of the resin-forming composition as a first package containing the polyether-ene and the free radical initiator and a second package containing the free radical-polymerizable compound and the promoter. It has been experimentally determined that the contents of each of these packages will remain stable even after prolonged storage, e.g., periods of 3 to 6 months or more, at ambient temperature although there may be a modest increase in cure time as the contents of the packages age. The contents of the packages can be uniformly mixed employing suitable equipment for this purpose.

The following examples are illustrative of the invention:

EXAMPLES 1–15

COMPARATIVE EXAMPLES 1–4

In the liquid resin-forming compositions whose formulations (Table I) and properties (Table II) are given below, the following polyether-ene and free radical-polymerizable compounds were used:

PAGE=polyallyl glycidyl ether (Santolink XI-100 described above)

IBOMA=isobornyl methacrylate

PhOEMA=phenoxyethyl methacrylate

TMPTA=trimethylolpropane triacrylate

NonylPh EO(9)MA=nonylphenol ethoxylate (9) methacrylate

HPM=hydroxypropyl methacrylate

MMA=methyl methacrylate

Cobalt (+2)=cobalt(+2) hexanoate

CHP=cumene hydroperoxide

Each of the liquid resin-forming compositions employed a 12 weight percent active metal solution of cobalt(+2) hexanoate as the promoter at a level of 2 weight percent and cumene hydroperoxide (80% active) as the free radical initiator at a level of 4 weight percent. The compositions were prepared by first uniformly mixing the polyether-ene and free radical-polymerizable monomer(s), measuring the volatility, flash point and viscosity of the resulting mixtures (with the exception of Example 14 where such properties were measured upon the fully formulated composition), and then uniformly adding the promoter and, finally, the free radical initiator.

TABLE I

LIQUID RESIN-FORMING COMPOSITIONS

Weight Percent

| Example | PAGE | IBOMA | PhOEMA | TMPTA | NonylPhEO(9)MA | HPM | MMA |
|---|---|---|---|---|---|---|---|
| 1 | 15 | 5 | 60 | 20 | — | — | — |
| 2 | 15 | 15 | 50 | 20 | — | — | — |
| 3 | 15 | 5 | 50 | 30 | — | — | — |
| 4 | 25 | 5 | 60 | 10 | — | — | — |
| 5 | 25 | 5 | 50 | 20 | — | — | — |
| 6 | 25 | 15 | 50 | 10 | — | — | — |
| 7 | 25 | 15 | 60 | — | — | — | — |
| 8 | 20 | 10 | 55 | 15 | — | — | — |
| 9 | 15 | 15 | 60 | 10 | — | — | — |
| 10 | 20 | 10 | 70 | — | — | — | — |
| 11 | 20 | 20 | 60 | — | — | — | — |
| 12 | 20 | 20 | 60 | — | — | — | — |
| 13 | 20 | 30 | 50 | — | — | — | — |
| 14 | 20 | 10 | 55 | 15 | — | — | — |
| 15 | 20 | — | 55 | 15 | — | — | 10 |

| Comparative Example | | | | | | | |
|---|---|---|---|---|---|---|---|
| 1 | 20 | 80 | — | — | — | — | — |
| 2 | 20 | 30 | 50 | — | — | — | — |
| 3 | 20 | — | — | — | — | 80 | — |
| 4 | 20 | — | — | — | 80 | — | — |

TABLE II

PROPERTIES OF LIQUID RESIN-FORMING COMPOSITIONS

| Example | Volatility[1] (wt. percent volatiles) | Flash Point[2] (°F.) | Viscosity[3] (centipoises) | Cure Time[4] (minutes) |
|---|---|---|---|---|
| 1 | 29 | >200 | 19.3 | 390 |
| 2 | 32 | >200 | 18.7 | 480 |
| 3 | 23 | >200 | 23.5 | 390 |
| 4 | 28 | >200 | 22.4 | 300 |
| 5 | 25 | >200 | 28.2 | 300 |
| 6 | 31 | >200 | 23.4 | 300 |
| 7 | 35 | >200 | 20.0 | 420 |
| 8 | 25 | >200 | 22.3 | 390 |
| 9 | 33 | >200 | 15.6 | 415 |
| 10 | 32 | >200 | | |
| 11 | 38 | >200 | | |
| 12 | | >225 | | |
| 13 | | >210 | | |
| 14 | <10 | >200 | 17.5 | 390 |
| 15 | <5 | >200 | 80.2 | 305 |

| Comparative Example | | | | |
|---|---|---|---|---|
| 1 | 80 | >200 | | 530 |
| 2 | 45 | >200 | | |
| 3 | 80 | >200 | | |
| 4 | 25 | <135 | | |

[1]ASTM-D-2369.
[2]ASTM-D-3278.
[3]ASTM-D-2393, 50 rpm spindle speed at 77° F.
[4]Measured by touch at 77° F.
[5]In this example only, volatility, flash point and viscosity were measured upon the fully formulated composition, i.e., the composition containing the free radical initiator and promoter. The addition of the initiator and promoter generally has little effect on the values of these properties measured upon the mixture of the polyether-ene and free radical-polymerizable monomer(s) components alone.

As these data show, both the nature and the amount of the free radical polymerizable monomer(s) influence the foregoing properties of the liquid resin-forming composition. If a particular monomer or combination of monomers results in, say, too high a viscosity, it may be possible to adjust the formulation by adding a less viscous monomer or to substitute part or all of the monomer(s) with one or more other less viscous monomers. Of course, care must be taken when adjusting or modifying the formulation of a particular liquid resin-forming composition to avoid a correction which would deleteriously affect some other property of the composition. Simple trial-and-error accompanied by use of the foregoing testing procedures will readily provide a wide variety of useful compositions.

EXAMPLES 16–18

In Table III below, the results of stability testing carried out upon each package of a two package system for preparing liquid resin-forming compositions in accordance with the invention are presented. The results of the stability testing are expressed in terms of the time (minutes) required to achieve surface cure with at least one of the test compositions after intervals of approximately 0 time (i.e., with the freshly prepared composition), 3 months and 6 months storage at ambient temperature.

TABLE III

STORAGE STABILITY OF TWO-PACKAGE SYSTEM

Components of the Two-Package System (Weight Percent)

| | First Package | | Second Package | | |
|---|---|---|---|---|---|
| Example | PAGE | CHP | IBOMA | Cobalt (+2) | MEKO[6] |
| 16 | 20 | 4 | 80 | 2 | — |
| 17 | 20 | 4 | 80 | 2 | 0.5 |
| 18 | 20 | 4 | 80 | 2 | — |

TABLE III-continued

STORAGE STABILITY OF TWO-PACKAGE SYSTEM

Surface Cure Time of Resin-forming Compositions (Minutes)
Obtained by Uniformly Mixing the First and Second
Packages of the Two-Package Systems

| Example | Control | 3 Months | 6 Months |
|---------|---------|----------|----------|
| 16 | — | 540 | 510 |
| 17 | — | 540 | 510 |
| 18 | 465 | — | — |

[6]MEKO = methylethylketone oxime, an inhibitor for the cobalt (+2) promoter.

As these data show, compositions prepared from two-package systems in accordance with the present invention remained stable even after 6 months storage at ambient temperature, there having been but minor increases in the cure time for the aged resin-forming compositions relative to that of the freshly prepared composition.

What is claimed is:

1. A liquid resin-forming composition which comprises a polyether-ene, a free radical-polymerizable monomer, a free radical initiator and a promoter, the polyether-ene and free radical-polymerizable monomer when mixed together having a volatility as measured by ASTM-D-2369 of not greater than about 40 weight percent, a flash point as measured by ASTM-D-3278 of not less than about 71° C. (160° F.) and a viscosity at 25° C. (77° F.) and 50 rpm spindle speed as measured by ASTM-D-2393 of not greater than about 100 centipoises and wherein this liquid resin forming composition has a surface cure time of not more than about 480 minutes at 25° C.

2. The composition of claim 1 wherein the polyether-ene is derived from the reaction of allyl glycidyl ether and a hydroxyl-containing compound.

3. The composition of claim 1 wherein the polyether-ene is derived from the reaction of allyl glycidyl ether and a glycol in a molar ratio of allyl glycidyl ether to glycol of at least about 8:1.

4. The composition of claim 1 wherein the polyether-ene is a polyallyl glycidyl ether of the formula

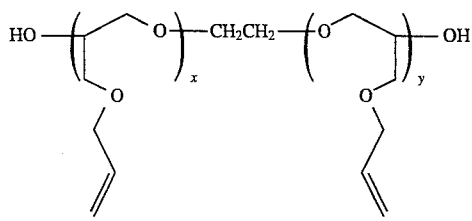

wherein the sum of x and y is at least about 8.

5. The composition of claim 4 wherein the free radical-polymerizable monomer is an acrylate ester.

6. The composition of claim 5 wherein the acrylate ester is selected from the group consisting of isobornyl methacrylate, nonylphenol ethoxylate(9) methacrylate, propylene glycol(8) dimethacrylate, triethylene glycol dimethacrylate, tripropylene glycol diacrylate, 1,4-butanediol diacrylate, 2-phenoxyethyl methacrylate, trimethylolpropane triacrylate, lauryl acrylate, myristyl acrylate, palmityl acrylate, oleyl acrylate, linolenyl acrylate, linolenyl acrylate, stearyl acrylate, and mixtures thereof.

7. The composition of claim 1 wherein the free radical-polymerizable monomer is an acrylate ester.

8. The composition of claim 1 wherein the free radical initiator is an organic peroxide and/or organic hydroperoxide.

9. The composition of claim 1 wherein the free radical initiator is an organic peroxide and the promoter is an amine.

10. The composition of claim 1 wherein the free radical initiator is an organic hydroperoxide and the promoter is a metal-containing salt and/or metal-containing complex.

11. The composition of claim 10 containing an accelerator.

12. The composition of claim 11 wherein the accelerator is an amine accelerator.

13. The composition of claim 1 wherein the volatility is not greater than about 35 weight percent, the flash point is not less than about 82° C. (180° F.) and the viscosity is not greater than about 40 centipoises.

14. The composition of claim 1 wherein the volatility is not greater than about 30 weight percent, the flash point is not less than about 93° C. (200° F.) and the viscosity is not greater than about 30 centipoises.

15. The composition of claim 1 having a surface cure time at 25° C. (77° F.) of not more than about 600 minutes.

16. The composition of claim 1 having a surface cure time at 25° C. (77° F.) of not more than about 400 minutes.

17. The composition of claim 1 wherein the polyether-ene is derived from the reaction of allyl glycidyl ether and a hydroxyl-containing compound, the free radical-polymerizable monomer is an acrylate ester, the free radical initiator is an organic peroxide and/or an organic hydroperoxide, the promoter is an amine when the free radical initiator is an organic peroxide and a metal-containing salt and/or metal-containing complex when the free radical initiator is an organic hydroperoxide, the volatility is not greater than about 35 weight percent, the flash point is not less than about 82° C. (180° F.) and the viscosity is not greater than about 100 centipoises.

18. The composition of claim 17 wherein the acrylate ester is selected from the group consisting of isobornyl methacrylate, nonylphenol ethoxylate(9) methacrylate, propylene glycol(8) dimethacrylate, triethylene glycol dimethacrylate, tripropylene glycol diacrylate, 1,4-butanediol diacrylate, 2-phenoxyethyl methacrylate, trimethylolpropane triacrylate, lauryl acrylate, myristyl acrylate, palmityl acrylate, oleyl acrylate, linolenyl acrylate, linolenyl acrylate, stearyl acrylate, and mixtures thereof.

19. The composition of claim 17 having a surface cure time of not more than about 600 minutes.

20. The composition of claim 17 wherein the volatility is not greater than about 30 weight percent, the flash point is not less than about 93° C. (200° F.) and the viscosity is not greater than about 30 centipoises.

21. The composition of claim 20 having a surface cure time of not more than about 400 minutes.

22. A two-part package system for preparing a liquid resin-forming composition which comprises a first storage stable package containing a polyether-ene and a free radical initiator and a second storage stable package containing a free radical-polymerizable compound and a promoter.

23. The two-part package system of claim 22 wherein the free radical initiator is an organic hydroperoxide and the promoter is a metal-containing salt and/or metal-containing complex.

24. The two-part package system of claim 22 wherein the polyether-ene is derived from the reaction of allyl glycidyl ether and a hydroxyl-containing compound, the free radical-polymerizable monomer is an acrylate ester, the free radical initiator is an organic hydroperoxide, the promoter is a metal-containing salt and/or metal-containing complex, the volatility of the liquid resin-forming composition as measured by ASTM-D-2369 is not greater than about 40 weight percent, the flash point of the composition as measured by ASTM-D-3278 is not less than about 72° C. (160°) and the viscosity of the composition at 25° C. (77° F.) and 50 rpm spindle speed as measured by ASTM-D-2393 is not greater than about 500 centipoises.

25. The two-part package system of claim 24 wherein the volatility of the liquid resin-forming composition is not greater than about 35 weight percent, the flash point of the composition is not less than about 82° C. (180° F.) and the viscosity of the composition is not greater than about 100 centipoises.

26. The two-part package system of claim 25 wherein the liquid resin-forming composition has a surface cure time of not more than about 600 minutes.

27. The two-part package system of claim 24 wherein the volatility of the liquid resin-forming composition is not greater than about 30 weight percent, the flash point of the composition is not less than about 93° C. (200° F.) and the viscosity of the composition is not greater than about 30 centipoises.

28. The two-part package system of claim 27 wherein the liquid resin-forming composition has a surface cure time of not more than about 400 minutes.

* * * * *